(12) United States Patent
Goerrn

(10) Patent No.: US 10,739,623 B2
(45) Date of Patent: Aug. 11, 2020

(54) WAVEGUIDE, METHOD OF PROJECTING LIGHT FROM A WAVEGUIDE, AND DISPLAY

(71) Applicant: BERGISCHE UNIVERSITÄT WUPPERTAL, Wuppertal (DE)

(72) Inventor: Patrick Goerrn, Wuppertal (DE)

(73) Assignee: BERGISCHE UNIVERSITAET WUPPERTAL, Wuppertal (DE)

(*) Notice: Subject to any disclaimer, the term of this patent is extended or adjusted under 35 U.S.C. 154(b) by 0 days.

(21) Appl. No.: 16/345,131

(22) PCT Filed: Oct. 20, 2017

(86) PCT No.: PCT/EP2017/001236
§ 371 (c)(1),
(2) Date: Apr. 25, 2019

(87) PCT Pub. No.: WO2018/086727
PCT Pub. Date: May 17, 2018

(65) Prior Publication Data
US 2019/0271864 A1    Sep. 5, 2019

(30) Foreign Application Priority Data
Nov. 10, 2016  (DE) ................. 10 2016 013 330

(51) Int. Cl.
    *G02F 1/035*   (2006.01)
    *F21V 8/00*    (2006.01)
    *G02F 1/01*    (2006.01)

(52) U.S. Cl.
    CPC .......... *G02F 1/035* (2013.01); *G02B 6/0035* (2013.01); *G02B 6/0041* (2013.01); *G02F 1/011* (2013.01);
    (Continued)

(58) Field of Classification Search
    None
    See application file for complete search history.

(56) References Cited

U.S. PATENT DOCUMENTS 6,501,869 B1 * 12/2002 Athale ............... G02B 6/3596
                                                        385/17
7,058,256 B1    6/2006 Stoll
(Continued)

FOREIGN PATENT DOCUMENTS

FR          2577328 A        8/1986
JP     2013197071 A  *   9/2013
(Continued)

*Primary Examiner* — Rhonda S Peace
(74) *Attorney, Agent, or Firm* — Andrew Wilford

(57) ABSTRACT

The invention relates to a waveguide comprising a substrate (1) on which a layer stack (2) of at least two layer formations (3a, 3b) is arranged, each layer formation (3a, 3b) having at least one transparent dielectric layer (3a1, 3b2), in particular with a higher refractive index than the substrate (1). A structure which influences light propagation, in particular a structure (4) which extends in a layer-like manner, at least in some regions, is arranged between two adjacent layer formations (3a, 3b), the position of the structure (4) in the layer stack corresponding to a node position of a waveguide mode which can be guided in the waveguide and has at least one, preferably exactly one node (5a). The waveguide comprises at least one means for at least temporarily changing the position of the node (5a) of a guided waveguide mode and the structure (4) relative to each other. The invention also relates to a display consisting of at least one such waveguide and to a method for coupling light out of a waveguide, wherein the light is propagated as a waveguide mode with at least one node, the node position of which corresponds to the position, in the waveguide, of a structure influencing light propagation, and wherein the relative position of the node of the waveguide mode and the structure is at least temporarily (Continued)

Figure 1:
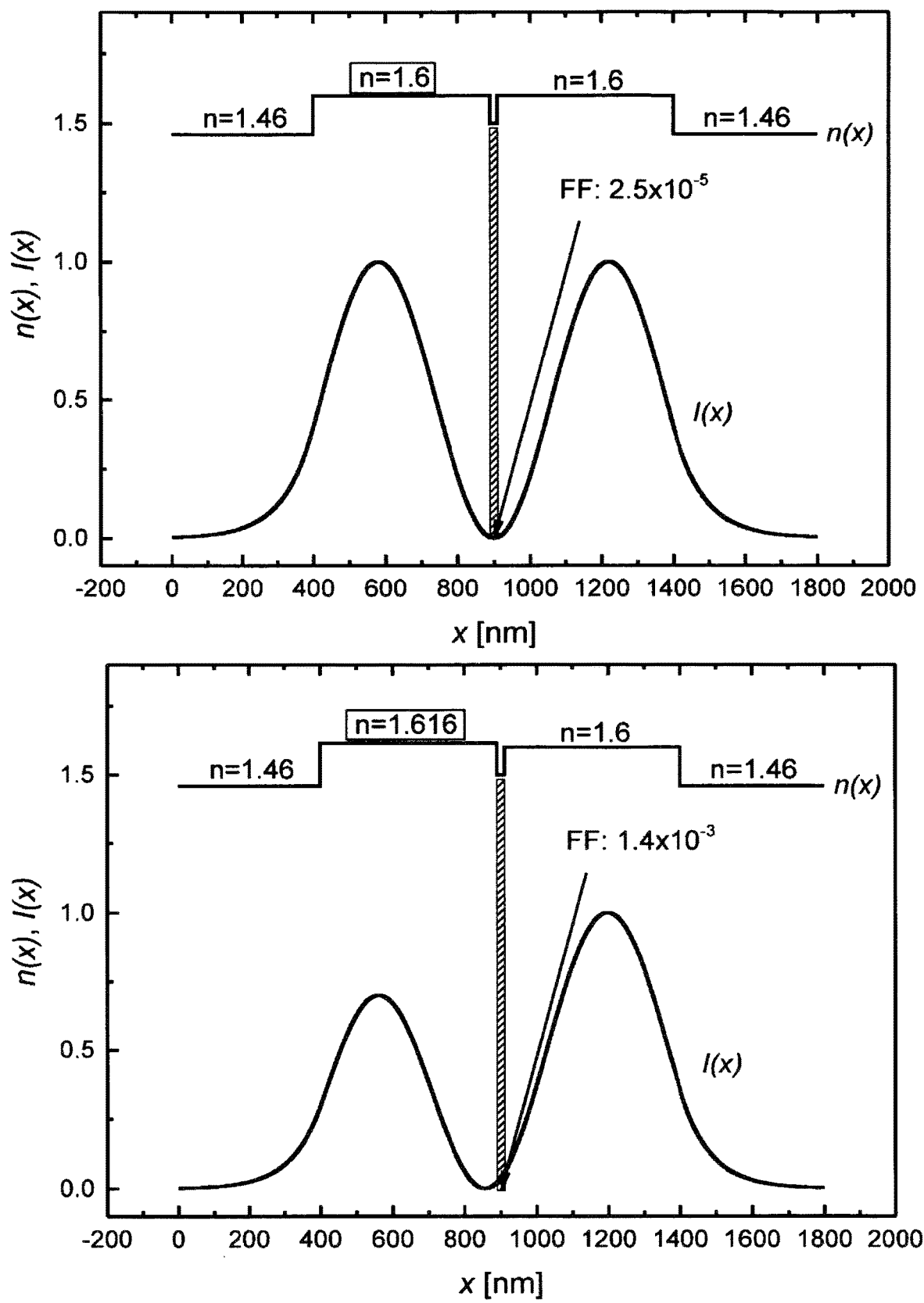

shifted, in particular by shifting the node relative to the structure or by shifting the structure relative to the node.

23 Claims, 9 Drawing Sheets

(52) U.S. Cl.
CPC .......... *G02B 6/0068* (2013.01); *G02B 6/0076* (2013.01); *G02F 2201/302* (2013.01)

(56) References Cited

U.S. PATENT DOCUMENTS

| | | | | |
|---|---|---|---|---|
| 7,447,417 | B2 * | 11/2008 | Uemoto | G02B 6/0055 349/113 |
| 8,637,859 | B2 | 1/2014 | Phenitzka | |
| 8,755,647 | B2 * | 6/2014 | Yaacobi | G02B 6/264 385/27 |
| 9,057,926 | B1 * | 6/2015 | Brown | G02F 1/31 |
| 2008/0049450 | A1 * | 2/2008 | Sampsell | G02B 6/0046 362/619 |
| 2009/0135622 | A1 * | 5/2009 | Johnson | G09F 13/22 362/602 |
| 2010/0259804 | A1 * | 10/2010 | Buschbeck | G02B 6/001 359/34 |
| 2013/0105770 | A1 * | 5/2013 | Pschenitzka | H01L 31/022491 257/40 |
| 2015/0177438 | A1 * | 6/2015 | Drolet | G02B 6/0035 349/65 |
| 2015/0378183 | A1 * | 12/2015 | Pernice | G02B 6/00 385/1 |
| 2017/0168277 | A1 * | 6/2017 | Goerrn | G02B 5/008 |
| 2018/0275402 | A1 * | 9/2018 | Popovich | G02B 27/0103 |
| 2019/0271864 | A1 * | 9/2019 | Goerrn | G02F 1/035 |

FOREIGN PATENT DOCUMENTS

| | | |
|---|---|---|
| JP | 2013197071 B | 9/2013 |
| WO | 2008125926 A | 10/2008 |

* cited by examiner

WAVEGUIDE, METHOD OF PROJECTING LIGHT FROM A WAVEGUIDE, AND DISPLAY

CROSS REFERENCE TO RELATED APPLICATIONS

This application is the US-national stage of PCT application PCT/EP2017/001236 filed 20 Oct. 2017 and claiming the priority of German patent application 102016013330.9 itself filed 10 Nov. 2016.

The invention relates to a waveguide comprising a substrate carrying a stack of at least two laminates each having at least one transparent dielectric layer, particularly at least one transparent dielectric layer with a higher refractive index than the substrate, and a structure influencing light propagation, preferably a structure that extends as a layer at least in some regions, between two adjacent laminates, the position of the structure in the stack corresponding to a node position of a waveguide mode that can be guided in the waveguide with at least one node, preferably exactly one node. Modes that can be guided in the waveguide include $TE_n$ or $TM_n$ mode, as well as $HE_{nm}$ or $EH_{nm}$, each with at least one node in the direction of growth (i.e. $n \geq 1$ and m has any value).

The laminates are preferably arranged one on top of the other on this substrate in a direction perpendicular to the substrate surface. This corresponds to stacking in the direction of growth of the layers. The structure continues to lie on a plane parallel to the substrate surface. On this plane, the structure can be flat, or it can also be merely linear.

The invention also relates to a method of coupling light out of a waveguide, particularly from one of the above-described type, the light propagating as a waveguide mode with at least one node whose node position corresponds to the position of a structure influencing light propagation in the waveguide.

The invention also relates to a display with a row and column arrangement of controllable subpixels comprising at least one waveguide.

A waveguide of the above-described type is known from PCT/EP2014/001809 that is the applicant's own application. The arrangement described therein is used to couple light that is incident on the waveguide from the outside via the structure into the waveguide by influencing the light propagation, particularly through scattering, while simultaneously ensuring that the same structure does not conversely have an outcoupling effect for the light.

Such outcoupling is avoided by exciting a mode in the waveguide that has at least one, preferably exactly one node in the transverse intensity distribution and by arranging the waveguide such that said structure is arranged in the node position with respect to its position when viewed in the stacking direction, whereby the structure is acted upon only negligibly at most by the light intensity during the propagation of the light, so that practically no scattering of light propagated in the waveguide occurs on the structure.

Such a waveguide thus has the advantage of concentrating light from the environment in itself but also the disadvantage of not offering any direct possibility for outcoupling light, particularly in a selective manner as needed.

It is therefore an object of the invention to further develop such a known waveguide such that low-loss propagation of light is made possible therewith while also enabling outcoupling as needed, particularly at a plurality of different positions, each of which can be selected by a control. It is also an object to provide a display with at least one such waveguide and to develop a method of coupling light out of such a waveguide.

The object is achieved with respect to the waveguide in that the waveguide comprises at least one means for at least temporarily changing the position of the node of a guided waveguide mode and of the structure relative to one another. For this purpose, the waveguide can comprise at least one means for at least temporarily shifting the node of a guided waveguide mode relative to the structure influencing light propagation or for at least temporarily shifting the structure relative to the node, for example. It is thus preferred in the first-mentioned embodiment for the spatial position of the node in the waveguide to be changed by such a means and, in the second embodiment, for the spatial position of the structure in the waveguide to be changed. Where the abbreviated term "structure" is used in the following description, it is also intended to refer in each case to a structure influencing light propagation.

According to the invention, a method of the coupling-out of light thus is based on an at least temporary shifting of the relative position of the node of the waveguide mode and of the structure relative to one another, particularly by shifting the node relative to the structure or by shifting of the structure relative to the node.

This has the technical effect of causing the node position of the guided waveguide mode to no longer coincide with the position of the structure, so that this structure is no longer directly surrounded by the intensity minimum present in the node position, but rather is now overlaid with a significant intensity of the transverse profile of the mode as a result of the shift, so that this structure influences the light propagation such that light is coupled out of the waveguide.

The desired functionality in the above-described prior art between structure and waveguide mode, namely only to couple light into the waveguide, but not to influence the mode propagating in the waveguide, is thus deliberately eliminated according to the invention at least temporarily by this means.

In one possible preferred embodiment, said structure can be configured as a scattering structure and/or diffractive and/or reflective structure for the purpose of coupling light out of the waveguide. By virtue of such a structure, the direction of propagation relative to the waveguide mode can thus be changed, which can result in outcoupling.

In contrast to scattering, diffracting, or reflecting structures that are named passively in the following and primarily change the direction of propagation of the guided mode, luminescent structures could also be used. In the first step, the luminescence-exciting guided mode would be absorbed in the structure. For the purposes of the invention, the absorption would depend on the fill factor of the structure, that is, it would be adjustable by shifting the mode relative to the luminescent layer in the node. After absorption, light of increased wavelength would be emitted over a wide angular range, so that a substantial portion of this light could leave the waveguide. Such an effect can be produced with at least one substance present in the structure that has phosphorescence, fluorescence, luminescence, or a Stokes shift between absorption and emission.

In the abovementioned embodiments, particularly in the case of a scattering structure, the possibility exists of the light-outcoupling structure being embodied as a structured layer of deposited metal. Such structuring can be present on a lateral size scale of less than 10 nm to a few micrometers.

The advantage of this approach is the fact that even very thin metallic structures that thus "fit" very well into the node position, are able to interact very strongly with light. This strong interaction is exploited in a number of plasmonic applications. A disadvantage of this approach is the need for targeted structuring.

In a development, a provision can therefore be made that, after the deposition, the initially unstructured and hence non-scattering metal layer is etched, whereby a scattering interaction with light can be achieved, particularly without the need for targeted structuring. It is especially advantageous if silver is provided as a metal.

A rough metal layer can also be created by first roughening the substrate and then depositing the metal layer. The roughening can be produced by a mechanical treatment of the surface, by irradiation with ions, plasma treatment, chemical treatment, and other methods. It is also possible to transfer the rough surface (e.g., a structurally etched silicon wafer) produced on another substrate to the surface of the waveguide, on which the scattering structure is thereby produced. The transfer can be performed by nanoimprinting, embossing, casting and curing, or similar methods.

Moreover, metallic nanoparticles (nanodots, nanowires, or the like) can be applied directly, e.g., by spray coating, dip coating, various printing techniques, or other deposition methods, for example from suspension. Spray coating in particular appears to be promising in terms of avoiding larger agglomerates. For instance, very thin layers of silver nanowires can be produced that exhibit strong diffuse scattering and are still partially transparent in the direction of growth and conductive in the lateral direction as a result of overlapping nanowires. These can therefore be used as a white scattering structure and, at the same time, as an electrode. A provision can also be made that the nanoparticles have a size of at least greater than 100 nanometers, particularly so that their absorption effect takes a back seat to their scattering effect. The resulting broadband (white-appearing) scattering is generated locally by reflection on metallic surfaces. Besides this local metallic reflection, local reflection between transparent, dielectric materials can also be used. For instance, transparent nanoparticles or crystallites can be embedded in a likewise transparent polymer matrix that, however, has either a higher or a lower refractive index. Instead of nanoparticles, air pockets can also be generated in the matrix (by breath figure, for example). It is also possible to exploit a separation between at least two polymers (e.g., block copolymers) of different refractive indices in order to generate scattering, i.e. statistical, structures. In any case, the overall structure of matrix and scattering element is thin enough to be compatible with the nodal concept.

A diffractive structure can be created by periodic changes in the height profile or refractive index profile at least in the direction of propagation of the guided mode. It is possible, for example, for such a structure that acts as a diffraction grating for the mode to be self-organized through the above-described segregation as a result of phase separation between at least two polymers (e.g., block copolymers) that can thus also produce periodic structures. The gratings can also be produced lithographically. In addition to electron beam lithography, standard photolithography can be used. Since the required structures are periodic, interference lithography, displacement Talbot lithography (DTL), or other lithography techniques that are simpler on large surfaces can also be used. The electron beam- or photosensitive material can also be applied in order to produce the structure. During lift-off, it would be deposited under the later structure, whereas is would be deposited over the structure during etching. In either case, the electron beam or photosensitive material would be removed after structuring. Another possibility is for the structure itself to contain or consist entirely of a correspondingly sensitive material, so that the lithographic structuring results in an influencing either of the geometric surface or of the refractive index of the structure or of both properties. The portion of the sensitive material remaining after structuring would remain in the structure in this case.

In contrast to the described methods for producing diffractive structures lithographically on the waveguide, it is especially preferred to transfer height profiles mechanically to the waveguide by replicating methods. This method appears to be advantageous because very efficient blazed gratings are made by scoring with diamond tools. It is of course conceivable for this method to be applied directly to the waveguide. This method is slow, however. Since the waveguides consist in a very preferred form of cross linkable, highly transparent polymers whose surface structure can be influenced very well by mechanical imprinting, it is therefore promising to transfer scored originals by nanoimprinting, embossing, casting and curing, or similar methods to the lower transparent layer of the waveguide. When designing the originals, it should be noted that the structure is inverted during transfer. According to the above definition, the structure is produced through the transfer of the structured upper part of the lower transparent layer of the waveguide. However, if this structure were then coated by coating with the upper transparent polymer having the same or at least a very similar refractive index, the structured interface would be leveled and the diffractive effect completely or at least almost completely destroyed. The final effective structure is therefore first produced by coating the structured surface with a material that differs from the underlying structured material in terms of its optical properties. This coating can be performed with metals, dielectrics having different refractive indices, particles, or other means described above. The top waveguide polymer can be applied only after this coating. In a preferred embodiment, this application of the upper polymer can also be performed by lamination. This makes it conceivable, in particular, for symmetrical structures to be achieved. Diffractive structures are preferred over scattering structures, especially if color or directional selectivity is desired for the outcoupling.

In principle, two approaches are conceivable as means for the relative displacement of the node of a guided waveguide mode and the structure relative to one another.

First, the structure in the waveguide can be mechanically detuned, particularly through local shifting. Micro- or nano-mechanical systems such as electrostatically displaceable metal membranes, for example, can be used for this purpose. These membranes would thus become a structure according to the invention, which can be mechanically shifted in or counter to the direction of growth. As a result of this shift, the node position would also change slightly. However, it is essential that the position of the structure be able to be shifted relative to the node position.

Second, the structure can remain stationary in the waveguide while the waveguide is influenced such that the guided mode node position changes slightly. This embodiment is preferred because it is technologically easier to implement and promises substantially higher switching speeds. Any element or arrangement of a plurality of elements relative to one another with which the position of the node of the transverse mode propagating in the waveguide can be influenced is suitable here in principle.

The two options can also be combined with one another in principle.

It is especially preferred according to the invention if a means is selected that can change the optical thickness of at least one layer of the stack, preferably of a layer of at least one of the laminates that is adjacent the light-outcoupling structure.

Such a change can be provided permanently or also temporarily, i.e. transiently. For example, the node position can be toggled between two or more states or values. This opens up the possibility of repeated outcoupling of light from the waveguide and thus also the application of the invention to displays, e.g., those with a row and column arrangement of controllable subpixels comprising at least one waveguide according to the invention, the subpixels by the respective means being defined for the at least temporary shifting of the node.

In the context of this description, the term "subpixel" is used in the context of a display, since such subpixels form a typically monochrome portion of an overall colored pixel in typical color applications. A "subpixel" can only be regarded as being identical to a pixel of the display in the case of a purely monochrome display or in the case of displays that time-control subpixels successively in monochromatically different manners.

The "optical thickness" of a layer is understood to mean the product of the geometric thickness of the layer and the refractive index of the layer. The geometric thickness, the refractive index, or both can thus be influenced simultaneously with the means according to the invention. In general, a "means" is understood to refer to not just a single element, but rather a plurality of elements that work together to produce the effect of shifting nodes and structure relative to one another.

In a preferred embodiment, a provision is made according to the invention that an electric field can be generated at least temporarily with a respective means in the stack. Such a respective field-generating means can, for example, comprise at least two, preferably exactly two controllable electrodes arranged in or on the stack to which a time-dependent electrical voltage is particularly applied externally for the purpose of carrying out the method with which an electric field can be generated at least temporarily in the stack. A voltage source can thus also be understood as belonging to the (field-generating) means.

A provision is made in this regard that at least one layer of the stack is penetrated by the generatable electric field, the layer being preferably a layer that adjoins the light-outcoupling structure, preferably without spacing. For example, a provision can also be made that two or more layers of the stack are penetrated by an electric field. The electric fields in a plurality of such layers can be the same or different in terms of field intensity and/or field direction.

If a plurality of layers are penetrated by an electric field, then the invention can preferably make a provision that the field is generated simultaneously with the means for field generation in each penetrated layer.

In the event that two layers are penetrated with an electric field, these layers can be preferably arranged around the structure, meaning that the structure can be enclosed by these two layers.

A respective layer penetrated by the field can, for example, be the single layer of one of the two laminates of the stack or also a layer of a plurality of layers of a laminate.

The optical thickness of the penetrated layer can be changed through the effect of the electric field that can be generated at least intermittently, thereby altering the tuning of the waveguide and shifting the node position of the mode relative to said structure. Depending on the field effect, an outcoupling of light can thus be effected locally at the location of such a means, it being possible for the intensity of the outcoupling to also be influenced by the intensity of the field.

It is especially advantageous if the layer penetrated by the electric field has a refractive index that can be changed with the generatable electric field. Preferably, one of the layers penetrated by the field is used in which the refractive index can be changed as a result of the electro-optical effect. For example, a change in the refractive index by the Pockels or Kerr effect is possible.

In another embodiment, the layer penetrated by the electric field can have a geometric thickness that can be changed with the generatable electric field, for example as a result of the electrostrictive or piezoelectric effect in the layer. A dielectric layer that is electrocapacitively deformed through application of a voltage is also conceivable as a layer whose optical thickness is changed. Liquids or liquid crystals that can be changed by an electric field in terms of their optical thickness are likewise conceivable.

In embodiments in which the means used for nodal displacement preferably comprise at least two or exactly two electrodes for generating an electric field, the invention can make a provision that at least one of the electrodes of a means is arranged at the node position or at least in the vicinity of a node position of a waveguide mode that can be guided in the waveguide.

On the one hand, this causes the electric field to pass through a central region of the waveguide located close to the structure, so that shifts of the node position are possible even with comparatively small voltages between the electrodes. On the other hand, the positioning of at least one of the electrodes at or near the node position has the effect that this electrode itself contributes only slightly to the influencing of light, since the electrode and the structure are exposed to only negligible light intensity of the mode, if at all.

The preferred region for arranging an electrode is understood to be that region around the exact node position in which the intensity is less than $1/e \times$maximum intensity, preferably less than $\frac{1}{10} \times$maximum intensity, more preferably less than $\frac{1}{100} \times$maximum intensity, and especially preferably less than $\frac{1}{1000} \times$maximum intensity of the next intensity maximum next to the node. The state in which no node displacement is acting on the propagating mode is considered here.

A provision can be made according to the invention that all electrodes of a means are arranged in a node position or at least in the vicinity of a node position of a waveguide mode that can be guided in the waveguide. The electrodes are preferably spaced apart in at least one of the possible directions of propagation of a waveguide mode. Surface regions of adjacent electrodes can be embodied so as to be interdigitally intermeshing. An electric field can thus be effectively generated between the adjacent electrodes in a region around the light-outcoupling structure, thus shifting the node position at the site of the field effect.

In an arrangement of one or both or a plurality of electrodes of a means at the node position, according to the invention a respective formed electrode is formed by the light-outcoupling structure itself. Structure and electrode are thus formed together. This can have advantages in terms of production engineering.

A respective electrode formed in the vicinity of the node position but not exactly in the node position can be arranged, for example, so as to adjoin the light-outcoupling structure, e.g., without spacing. In a successive layer-by-layer production process for manufacturing the waveguide, an electrode can thus be introduced into the laminate of the waveguide after or before the structure is produced.

The invention can also make a provision that one electrode is spaced apart in the stacking direction from another electrode that is arranged at the node position or at least in the vicinity of the node position. This spaced electrode can be arranged, for example, so as to be adjacent the entire stack, preferably between the substrate and the stack, or at a different node position of the same guidable waveguide mode. The two latter-mentioned embodiments have the advantage here that also this spaced electrode is outside of the effect of light intensity of the mode. The configuration of the electrodes in the same node position or in two different node positions of two nodes of the waveguide mode has the advantage over the arrangement of one or both electrodes outside the stack that lower voltages are required to change the optical thickness of the layer adjacent the structure, since a sufficiently strong field intensity is already produced at lower voltages due to the then-smaller electrode spacing in order to sufficiently change the optical thickness.

In order to ensure that such a second electrode spaced apart in the stacking direction from a first electrode can be penetrated by diffracted or scattered or otherwise deflected light, the invention can make a provision that the electrode be transparent, for example in the form of a TCO (transparent conductive oxide) layer. Additional options for transparent or semitransparent electrodes include ultrathin metal layers, particularly those that are stabilized by transparent layers in order to prevent island growth. Such layers are preferably referred to as ultrathin if they have thicknesses of less than 10 nm. Composites that incorporate carbon nanotubes, silver nanowires, or others into a transparent dielectric or semiconducting matrix (e.g., tin oxide) can also be considered. As mentioned above, films that consist only of silver nanowires are also conceivable as semi-transparent electrodes that can simultaneously form scattering structures.

In the simplest embodiment, a provision can be made according to the invention that exactly one means of the above-described type is provided in a waveguide for the purpose of effecting a nodal displacement.

Preferred embodiments can also provide for the construction of a display from at least one waveguide having a plurality of means of the above-described type. Such several means are preferably formed as an n×m matrix, where n>=1 and m>1, with such a matrix preferably having rows and columns that are oriented perpendicular to one another.

It is thus possible, for example, to form a display in which a subpixel of a display formed by the matrix is defined by the region considered particularly in the stacking direction in which the respective means causes the change in the position of the node of a guided waveguide mode and the structure relative to one another. Light-outcoupling thus occurs where such a change is present.

In the stacking direction of the stack of successive electrodes of a means, a subpixel is thus delimited at least substantially by the geometric outer edges of an electrode, particularly by the volume between the outer edges of two electrodes. At least one region that lies between the surface areas of the electrodes that overlap in the stacking direction is illuminated. The electrodes that are spaced apart in the stacking direction can be preferably congruent when viewed in this stacking direction. This is not absolutely necessary, however. Preferably, at least the electrode that lies in the direction of emission is transparent here.

In the case of electrodes that are arranged in the direction of propagation of the waveguide mode, particularly in a common node position, a subpixel is likewise defined by the region that is illuminated by the means associated with it. However, there is no overlap or at most slight overlap between the electrode surfaces in the direction of spacing. Preferably, this is at least one region that lies between the opposing electrode edges of two electrodes that are spaced apart in the direction of propagation that are part of the means. The overall luminous area will comprise at least this region between the electrode edges and be generally larger, since the electric field does not extend only between the edges.

In monochrome embodiments of a display, a respective subpixel can form the only luminous image region of each matrix position in an n×m matrix. As mentioned at the outset, such a subpixel thus forms the pixel as well at the same time in this special case of a display.

In the case of color displays, a provision can be made that a subpixel as defined above forms one of a plurality, preferably one of at least three subunits of an overall color pixel of each matrix position of the n×m matrix of a display.

In one possible embodiment, such respective means can be arranged multiple times in a respective waveguide in order to shift nodes and hence outcouple light at the location of the respective means. The plurality of means are then located at different locations on the waveguide so that, through selective actuation of the means, light at that waveguide can be coupled out to various locations that can be selected by the control.

For example, provision can be made for a plurality of means to be multiply arranged adjacent one another in the directions of propagation parallel to the layers. In a preferred embodiment, such a plurality of means can form an n×m matrix, where n≥1 and m>1, in which case a respective subpixel, and optionally even a pixel, is defined by each means In an embodiment in which a respective means has two electrodes, a provision can thus be provided that a display has a number of electrode pairs corresponding to the number of subpixels.

In another embodiment, a provision can also be made that a respective means comprises two electrodes, but one of the two electrodes is at the same potential for all or at least one group of means, meaning particularly that these means form a common ground electrode. In general, one element of one means, e.g., an electrode, can also be an element of another means, particularly of an adjacent means.

However, the invention can also provide for an embodiment in which a waveguide, particularly a single waveguide, comprises a first group of a plurality of electrodes lying parallel next to one another, each of which is stretched longitudinally in a first possible direction of propagation parallel to the layers, and in which it comprises a second group of electrodes lying parallel next to one another, each of which is stretched longitudinally in a second possible direction of propagation parallel to the layers.

The two possible directions of propagation can be preferably perpendicular to one another, particularly in order to form an above-described n×m display. The electrodes of one group can thus form row electrodes and the electrodes of the other group can form column electrodes.

This embodiment also makes a provision that the first and the second group are spaced apart in the stacking direction. In this case, a layer that can be penetrated by the electric field whose optical thickness can be changed in a field-dependent manner lies in the stacking direction between the two groups.

In this embodiment, a respective means is formed by the surface regions of electrodes of the first and second group that are arranged so as to overlap in the stacking direction. Each individual electrode is always associated with an entire row or an entire column of subpixels. Controlling an electrode of one group and an electrode of the other group, i.e. a row and a column electrode in the abovementioned sense with different electrical potential corresponding to the row and column of a desired subpixel, has the effect of generating an electric field in which the two electrodes cross when viewed in the stacking direction, so that light is coupled out of the intersection, which thus represents a subpixel.

In a preferred embodiment, a display of the type according to the invention can have exactly one waveguide. According to the above-described embodiments, such a waveguide can comprise all subpixel-defining means of the display. The waveguide can have a length-to-width ratio that corresponds at least substantially to the ratio of the number of subpixels in the respective directions.

In another embodiment, at least one separate waveguide can be associated with each row of subpixels in a display, in which case the means for changing the optical thickness perpendicular to the direction of longitudinal extension of these waveguides define the columns. Thus, by switching on a light source, a respective waveguide that is separate and associated only with this light source can be supplied with light and, in the case of the illuminated row defined in this way, the means belonging to the column can be controlled in order to bring about the outcoupling at the desired subpixel. A luminous subpixel can be actuated very quickly through combined selection of light and electricity.

In this case, each separate waveguide can be formed by a substantially strip-shaped waveguide, in which case all subpixels of a row are particularly arranged one behind the other in the longitudinal direction of extension of such a strip. The strip-shaped embodiment is thus initially achieved in the sense of the invention with the objective of associating a single waveguide to each row of the later display. If the width of this strip is of sufficient size relative to the wavelength of the guided light, then this strip-shaped waveguide can still be regarded in a physical sense as being a good approximation of a film waveguide. Only when the width is reduced so much that the multimodality is substantially limited in this direction, i.e. that the $HE_{nm}$ or $EH_{nm}$ can no longer be approached because of a very large m for the film modes $TE_n$ and $TM_n$, the strip-shaped film waveguide is to be regarded as a strip waveguide in the physical sense. Such actual strip waveguides can be exploited through the presence of lateral intensity minima in terms of the invention by also limiting the described structure in the direction of the width of the strip waveguide to the node position. In this case, the structure is not arranged (completely) in planar fashion on a plane parallel to the substrate surface, but rather linearly, or in strip-shaped fashion at most. This is also commensurate with the method according to the invention that can then also be applied in the lateral direction beyond the direction of growth. In the following, strip waveguides will be categorically addressed. Therefore, the association of the waveguide to a display row is meant below. The strip waveguide can be a strip-shaped film waveguide, or it can also be an actual strip waveguide in the physical sense. In the latter case, the inventive placement of the structure in the node can be transferred beyond the direction of growth to the lateral direction of the stripe width.

Generally, and hence independently of the specific embodiment of the row-and-column arrangement of a display matrix, the waveguide of a display can have at least one light source for the incoupling of light. The light of the light source can be coupled into the waveguide via an input coupler. For example, an input coupler can be a grating that is introduced into the surface of the waveguide and illuminated by the light to be coupled in at the angle that is required for incoupling.

The intensity of the light generated by the light source can be preferably changeable as a function of at least the number of means currently being actuated in order to change the node position. In particular, the intensity of the light source can thus be increased as the number of the controlled means increases. The invention can also make a provision for increasing the intensity of the light source as the intensity of the light to be coupled out at a respective means increases.

The light intensity to be coupled out at the location of a means or in the case of a subpixel can be preferably selected on the basis of the magnitude of the field intensity that is set with the respective means. The invention can therefore make a provision that the intensity of the light source is increased (also) as a function of the field intensity or the voltage applied across a means, meaning particularly that the intensity of the light source is increased as the field intensity increases.

With the invention, it is possible to ensure that each subpixel of such a waveguide always emits at the same light intensity for the same applied voltage regardless of how many subpixels are actuated simultaneously, and preferably also independently of how bright the respective subpixels are.

Such a mode of operation of a waveguide or of a display comprising at least one such waveguide can be referred to as a readjustment of the intensity of the light source(s) as a function of the total intensity output by outcoupling.

Waveguides of the above-described type or displays comprising same can be operated in monochrome or in color.

Preferably, a monochrome display can be formed if the waveguide of a display is supplied by a single light source or, in the case of a plurality of waveguides in the display, all light sources have the same spectrum.

In order to achieve a color image in a display, particularly in one of the type described above, the invention can make a provision in a possible embodiment for outputting different light spectra in succession over a respective subpixel, for which purpose a display or each waveguide provided therein preferably comprises at least three light sources that can be successively time-controlled, each of which emits light having a different light spectrum that is coupled into the respective waveguide of the display. Such an operation can also be referred to as a time-division multiplexing of the light sources.

In another embodiment for color imaging on a display, it is possible to subdivide each colored pixel into subunits, with each subunit forming a differently colored subpixel. Each subpixel, in turn, is defined by the means that causes the nodal displacement of the mode, with light of a different wavelength being coupled out of the waveguide by different subunits of a colored-appearing image region.

This can be achieved, for example, in that each subunit has a different structure influencing light propagation.

For example, each subunit can have a different grating/grating periodicity that couples light of different spectral composition out of the waveguide in the same direction of diffraction. Each structure may have a different color filter, particularly a color filter that is a bandpass filter and only allows the spectral range matching the filter mode to pass from the waveguide through during outcoupling. In these embodiments, a provision is preferably made that white light propagates in the waveguide mode, i.e. light with a wavelength composition that covers the spectral sensitivity of the eye. From this total spectrum, a different range of wavelengths is thus coupled out with each structure.

In another embodiment, a different wavelength conversion can be performed by the structure of a respective subpixel. Different wavelength-converting substances, particularly various phosphors, can be used for this purpose in the structure of each subpixel of a pixel, for example. In this embodiment, a mode can propagate in the waveguide of a display whose wavelength preferably allows for the different conversions. Preferably, a wavelength of the waveguide mode can be selected that corresponds to the shortest-wavelength color of the display, so that this shortest-wavelength color is produced by white scattering and the longer-wavelength ones by luminescence. In another embodiment, a wavelength of the waveguide mode can be selected that is shorter than all colors of the display (particularly a wavelength in the violet or ultraviolet range), so that all of these colors of the display are produced by luminescence.

Subpixels that form subunits of a color pixel of a display can be arranged spatially next to one another, or also stacked spatially on each other stack plane of a waveguide, particularly so as to be offset from one another in the stacking direction.

One embodiment of the invention can thus make a provision for a plurality of waveguides, preferably at least three waveguides, to be stacked in a display, in which case the different stacked waveguides particularly have light sources for incoupling light whose wavelength spectrum is different, particularly such that they cover a selected color space together.

The subpixels belonging to a color pixel of the display and the plurality of means of the stacked waveguides defining them are preferably arranged so as to not be aligned in the stacking direction, particularly so as to be offset.

The stacking direction preferably corresponds to a direction that is perpendicular to the direction of propagation, particularly at least perpendicular to the mean direction of propagation of the mode propagating in the waveguide. The stacking direction preferably corresponds to the direction of growth of the layers during their production.

Light of different spectrum is emitted by at least three subpixels that are located adjacently and on different layer planes, thus producing a total of one colored pixel that comprises the preferably at least three subpixels. The means of the adjacent subpixels of such a colored image region can be actuated simultaneously in order to perform the light-outcoupling.

However, each waveguide of a display can also generally comprise a plurality of separate light sources, in which case each of the separate light sources is capable of producing light of a different wavelength spectrum, and the different light sources are time-controlled so as to successively emit the light from all of the wavelength spectra with each pixel. A colored-appearing image region is thus formed only by a subpixel and its control means (electrodes), the impression of color being brought about by the inertia of the human eye. In this case, there are therefore no constructive or geometric subunits; the single subpixel becomes a colored pixel due to its time-controlled, successive multiple illumination with different colors.

Exemplary embodiments will be described below.

FIG. 1 shows the intensity distribution $1(x)$ of a $TE_1$ mode of the wavelength 532 nm that was determined by a transfer matrix algorithm for the likewise specified refractive index profile n(x) of a waveguide. The approximation of the film mode $TE_1$ applies to waveguides having a sufficiently large extension in the lateral directions. As described above, this requirement is often also met for a strip waveguide according to the invention.

For the purposes of the invention, the mode of choice for such film waveguides is usually $TE_1$, but $TM_1$ as well as correspondingly higher modes $TE_n$, $TM_n$, where n>1, are also conceivable. Only in very narrow strip waveguides is the mode of choice usually the corresponding derived mode with a node in the direction of growth $HE_{10}$. $EH_{10}$ as well as all modes $HE_{nm}$ and $EH_{nm}$ where n≥1 are also conceivable, however. The number of nodes m in the direction of the strip width is arbitrary.

FIG. 1 is thus limited by way of example to the usually selected film mode. The more highly refractive portion of the waveguide that is crucial for the guidance of the mode is formed between x=400 nm and x=1400 nm, with the mode also reaching evanescently into the low-refractive outer region (x<400 nm, x>1400 nm, index 1.46) that was assumed to be infinitely thick in the calculation. In reality, the thickness of this outer region should be large relative to the wavelength. The higher-refractive region with a total thickness of 1 µm is composed of two outer layers with a thickness of 490 nm and an inner layer. The inner layer with a thickness of 20 nm and an assumed refractive index of 1.5 is intended to represent the structure.

The transfer matrix algorithm describes only the simplified solution of an ideal, infinitely extended film waveguide. Accordingly, the algorithm requires perfect layers. Strictly speaking, this requirement is not fulfilled for the structure, since it must not be planar in the sense of an ideal layer, but rather rough or at least inhomogeneous with in terms of refractive index or absorption.

Nevertheless, it can be assumed that the inhomogeneity within the very thin structure located in or at least near the node of the waveguide does not result in a noticeable change in the fill factor (abbreviated to FF in the figure) of the $TE_1$ mode within this structure. The validity of this assumption has been confirmed by some preliminary experiments with thin scattering structures.

Under the simplified assumption described, the simulation can be used to determine the fill factor of the mode with the structure. This gives a good measure of how strongly the mode interacts with the structure.

In terms of the invention, a good waveguide is thus one in which the mode of choice undergoes a maximum change in the fill factor within the structure in the event of detuning caused by the means.

The example in FIG. 1 shows a completely symmetrical waveguide without detuning. The advantage of this symmetry is that the node of the $TE_1$ mode is always located exactly in the middle of the waveguide, irrespective of the wavelength, i.e. the color of the light. The same applies to all $TE_n$ and $TM_n$ modes with an odd n. Symmetrical waveguides are therefore generally preferred according to the invention, because they enable the functionality of the invention over a broad band. Such waveguides are therefore especially advantageous for color displays.

To break this symmetry, it is assumed in the simulation that the refractive index of one of the outer highly refractive layers surrounding the structure (originally 1.6) is increased by one percent to 1.616. The refractive index of all remaining layers is retained. The result of this slight detuning of the waveguide is an increase in the fill factor from $2.5 \times 10^{-5}$ to $1.4 \times 10^{-3}$. An increase in the refractive index of a layer by one percent thus changes the fill factor of the structure in this example by a factor of 56 (5600 percent). In general, the fill factor preferably increases at least by a factor of 10. This great change is essential to the inventive function of the waveguide. It is also directly linked to the contrast of the display based on this principle.

Figure 2:
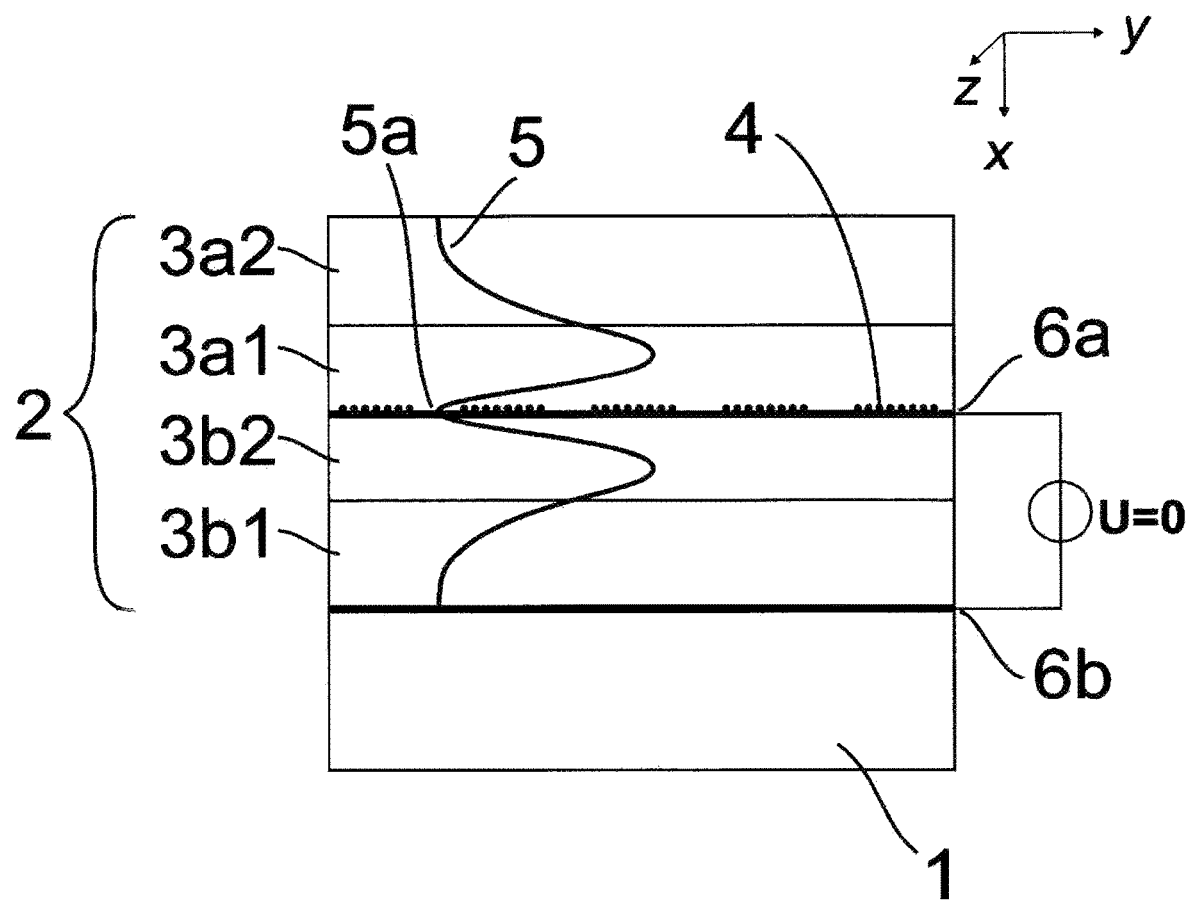
Figure 2:
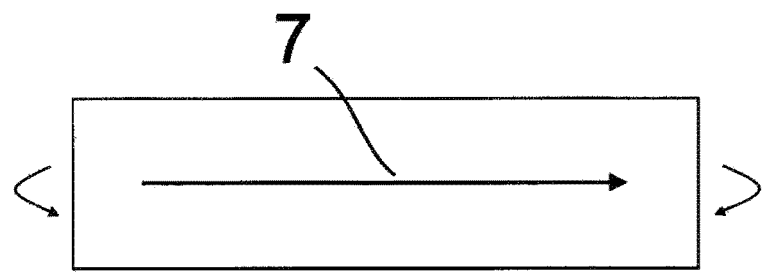

FIG. 2 shows a waveguide according to the invention with a substrate 1 at the bottom here on which two laminates 3a and 3b are arranged one above the other. In this embodiment, each laminate comprises two transparent dielectric layers 3a1, 3a2 and 3b1, 3b2, a light-outcoupling layer 4 being arranged between the laminates 3a and 3b. This can be embodied here as a particle-covered metal layer, for example.

By adapting the layer thicknesses and suitable choosing the refractive indices of the layer materials, the incoupled light is formed in the waveguide as a transverse mode 5 with, in this example, exactly one node 5a whose position coincides with the position of the light-outcoupling layer 4. The propagation of the mode is therefore nearly undisturbed in the waveguide by the layer 4.

According to the lower region of FIG. 2, the mode formed can thus propagate in the waveguide with little loss, according to the arrow 7. A reflective coating can be applied to the ends of the waveguide in order to achieve a reflection (symbolized by the curved arrows).

The invention makes a provision, for example, that an electrode 6a is placed adjacent the light-outcoupling layer 4, and an additional electrode is formed between the substrate and the first layer of the lower laminate 3b. In the lower laminate 3b, the upper layer 3b2 is selected as a layer with electro-optical properties whose refractive index can thus be influenced by an electric field that can be formed between the electrodes 6a and 6b.

FIG. 2 shows the case of undisturbed mode propagation, i.e. without the field switched on, where the node position Sa thus coincides with the position of the outcoupling layer 4.

Figure 3:
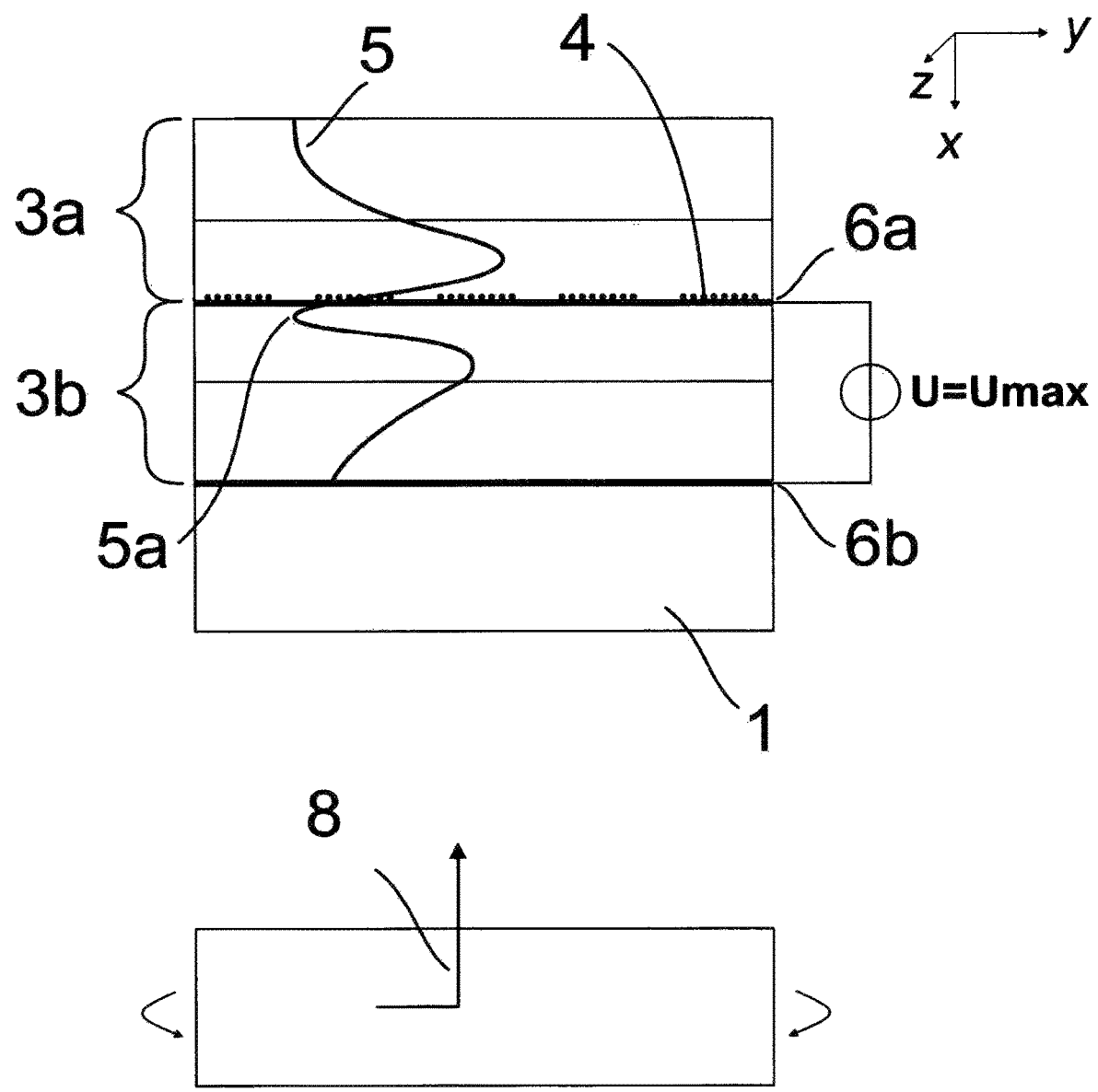

According to FIG. 3, an electric field is formed between the electrodes 6a and 6b that results in a change in the refractive index in the laminate 3b, here in the layer 3b2 according to FIG. 2, for example. As a result, the waveguide is detuned in such a way that the node position shifts in the waveguide relative to the layer 4. Consequently, a significant intensity of the transverse mode profile interacts with the layer 4, so that light is coupled out of the waveguide according to the arrow 8. In contrast to FIG. 1, the intensity profiles in FIGS. 2 and 3 are not exact solutions, but merely serve as sketches for visualization.

Figure 4:
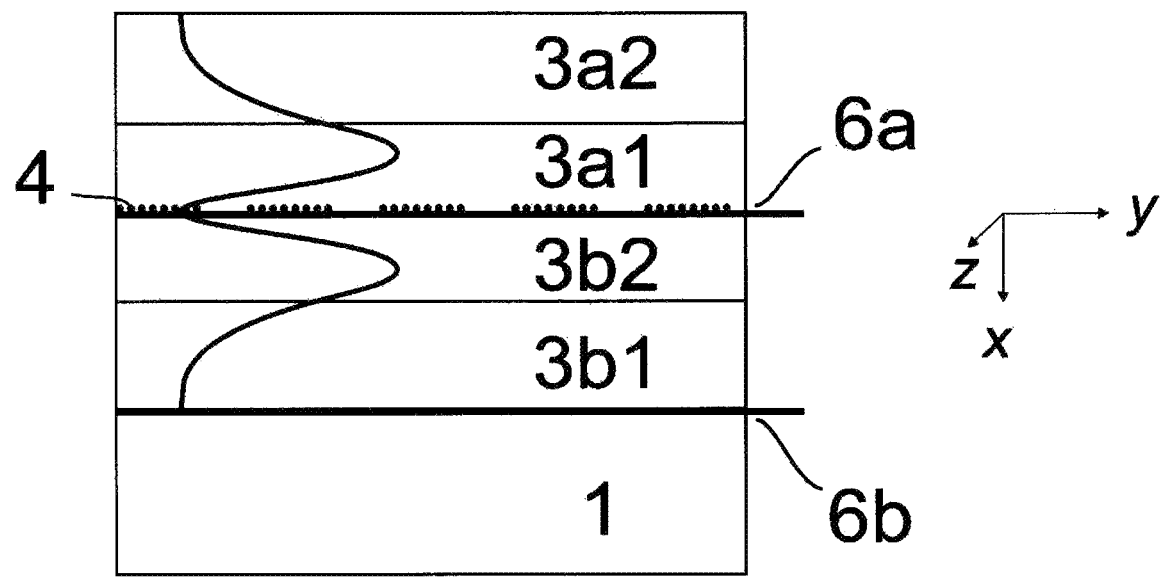
Figure 4:
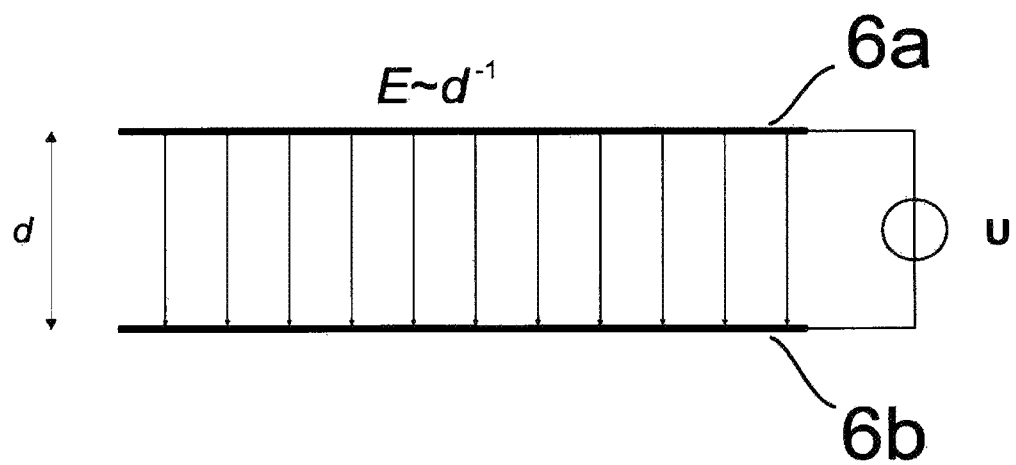
Figure 5:
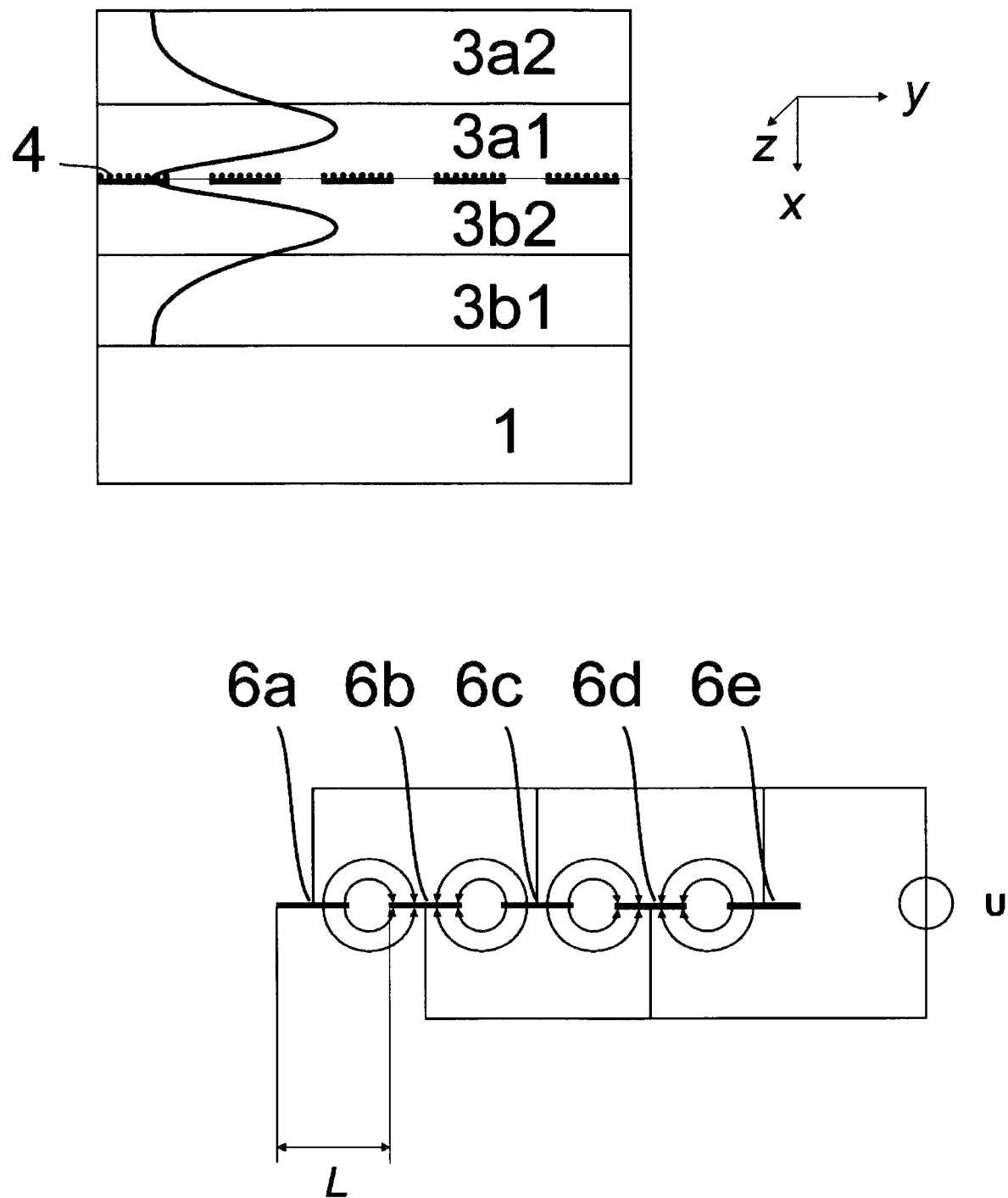
Figure 6:
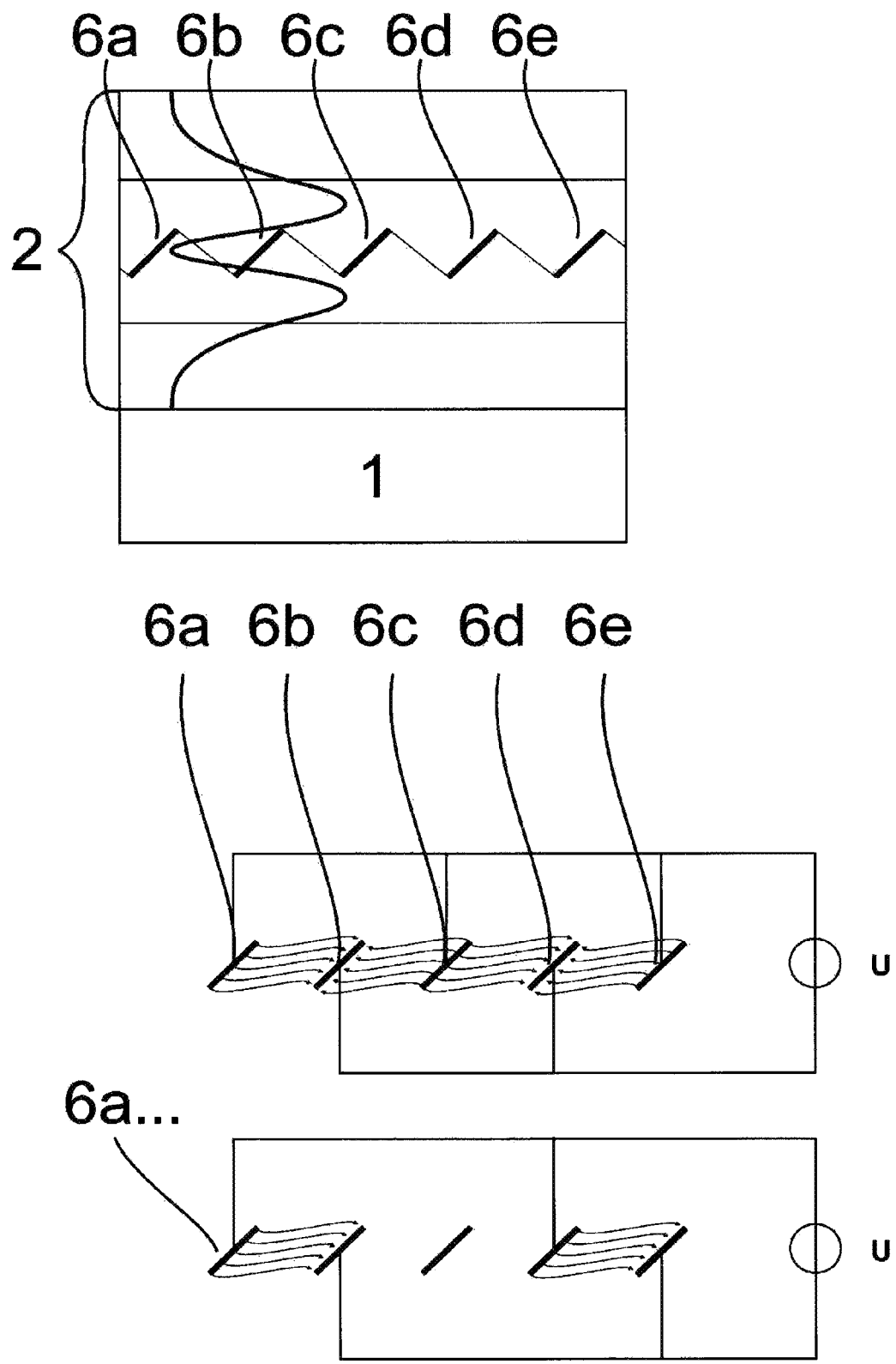

FIGS. 4 to 6 show different embodiments of the electrode positioning. In these embodiments, the structure is stationary in the waveguide while the waveguide is influenced such that the guided mode node position changes slightly.

In FIG. 4, the electrodes 6a, 6b are arranged as already described for FIGS. 2 and 3. According to the illustration at the bottom of FIG. 4, a transverse electric field is produced that penetrates the layer 3b2 perpendicular to the direction of propagation of the mode, thereby changing the refractive index of the layer 3b2. A disadvantage of this structure is the fact that the amount of electric field intensity E decreases as the electrode spacing d increases ($E\sim d^{-1}$). However, the lower electrode 6b that is not located in the node, requires a high electrode spacing d in order to minimize the propagation losses of the mode. In this structure, a compromise must therefore be found between propagation loss and the lowest possible switching voltage. The structure in FIG. 5 shows a way out of this problem.

In FIG. 5, an arrangement is selected in which all electrodes of the means formed at least in part by same are arranged in the node position or at least in a region around the node position. In this embodiment, the means comprises the adjacent electrodes 6a to 6e, etc. In this example, each electrode and the second following electrode are at the same potential (i.e. 6a, 6c, 6e "at one potential, 6b, 6d" at the second different potential). An electric field is thus applied between two adjacent electrodes that, in turn, passes through the layer 3b2 in the lower region and alters its refractive index. The locally acting field intensity at a given applied voltage is no longer dependent solely on the thickness of the dielectric layers but rather primarily on the electrode spacing L. For L<<d, an especially low switching voltage can be achieved in this respect. Since all electrodes and the structure are in the node, low propagation losses can be achieved in this case.

In FIG. 6, the light-outcoupling structure is a blazed grating that is located in a region around the node position, preferably in accordance with the condition stated in the general part. The grating structure is shown in exaggerated form here only for the sake of recognizability and can actually be located within the intensity environment defined above.

Here, the embodiment is chosen such that the grating structure comprises electrode surfaces that are angled with respect to the direction of propagation, i.e. neither perpendicular nor parallel thereto. In one embodiment (upper circuit diagram), as was already described in FIG. 5, every second electrode can be at the same potential and an electric field can be generated between them accordingly. This field is then aligned substantially in the direction of propagation of the wave, with the mean (predominant) field direction reversing from one region between the electrodes to the next. According to the lower circuit diagram, it is also possible to generate a field whose predominant field component lies without reversal of direction in the direction of propagation. Here, too, the refractive index is changed in the layer 3b2 in this manner, and the node position is shifted.

Figure 7:
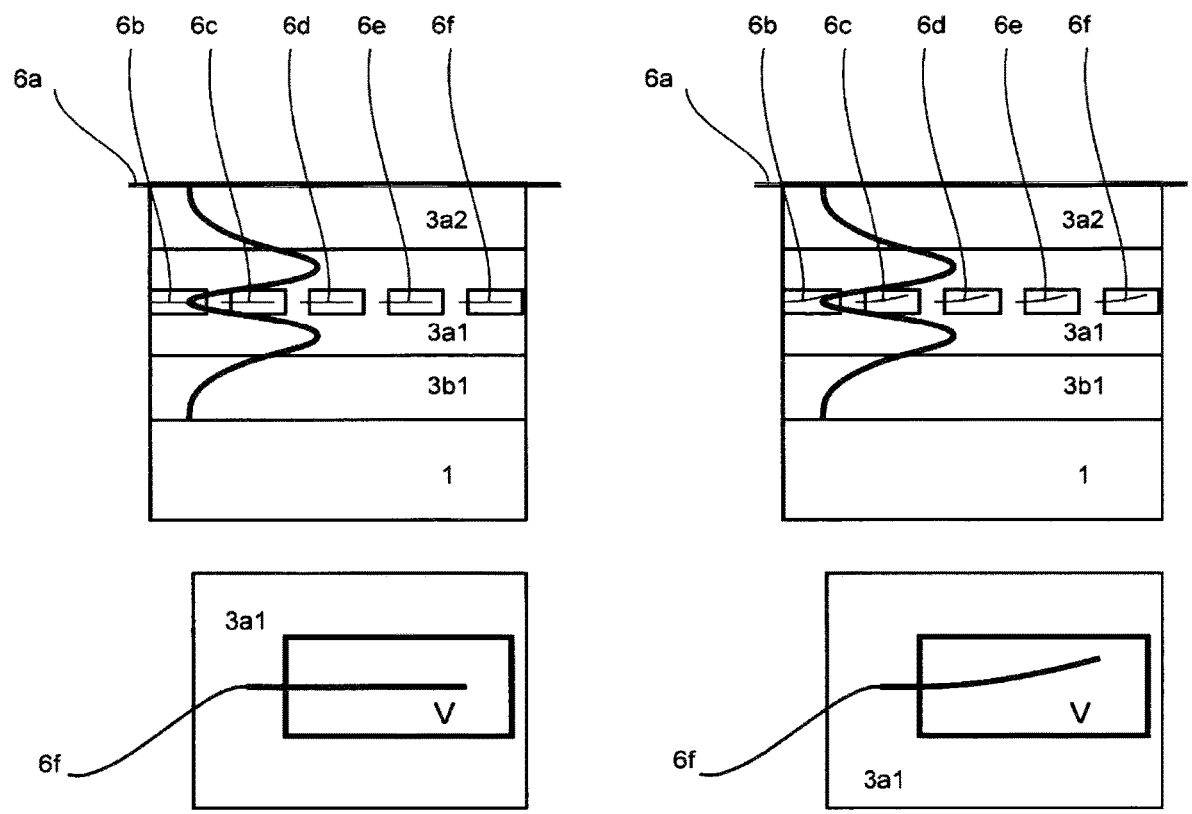

FIG. 7 shows an embodiment in which the structure is mechanically detuned in the waveguide, particularly in the sense of a local displacement. The structure is formed here by metallic membranes, for example that simultaneously form electrodes. The membranes are in an empty or air-filled volume (V) within the highly refractive dielectric 3a1. A layer whose optical thickness can be varied by the electric field is not required in this embodiment. Without an applied field, a respective membrane electrode 6b, 6c, . . . is flat and has a plane parallel to the layer planes. The membrane electrodes are thus flat and fit into the node of the mode. Through application of a voltage between a membrane electrode and the common ground electrode 6a, the corresponding membrane electrode is displaced from the node and thus interacts more strongly with the guided wave. A subpixel can be defined from a respective single membrane electrode or preferably by a group of several, particularly at least two, preferably adjacent membrane electrodes in conjunction with the common electrode 6a. The latter embodiment can ultimately also produce artificial gratings with adjustable grating periods and thus tune the color and/or direction-dependence of the local outcoupling. Different numbers of preferably adjacent membrane electrodes can be combined for this purpose into a respective group for different grating periods, for example. Within a group the membrane electrodes are all actuated in the same way, for example.

Figure 8:
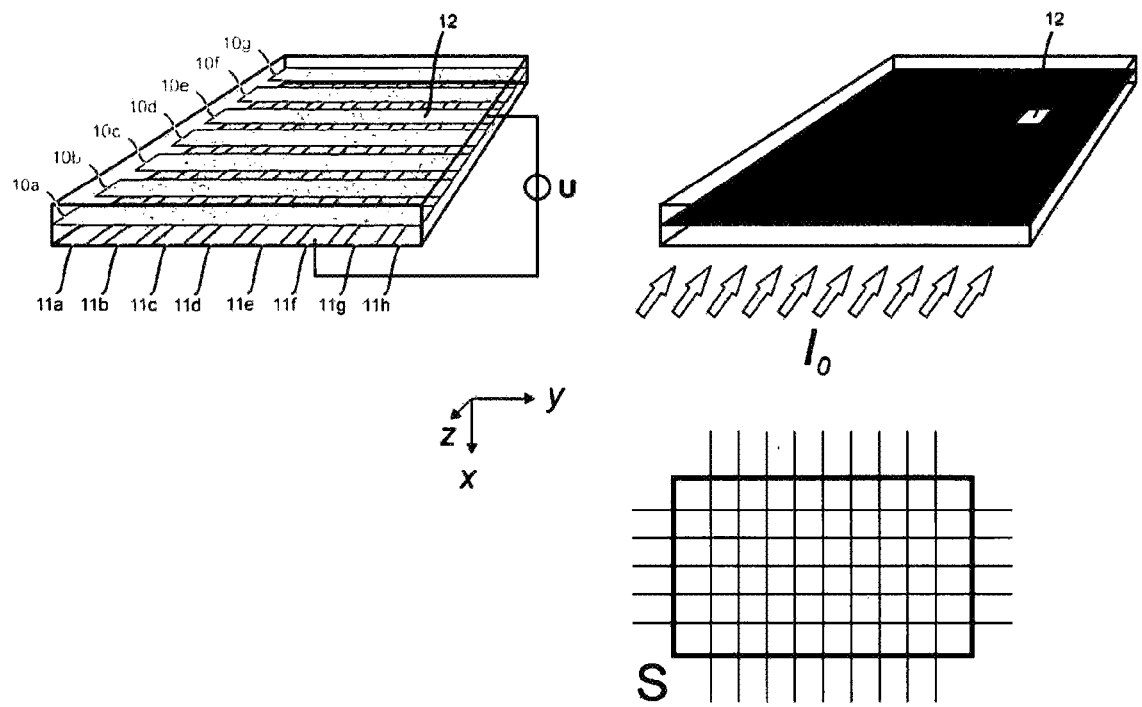
Figure 9:
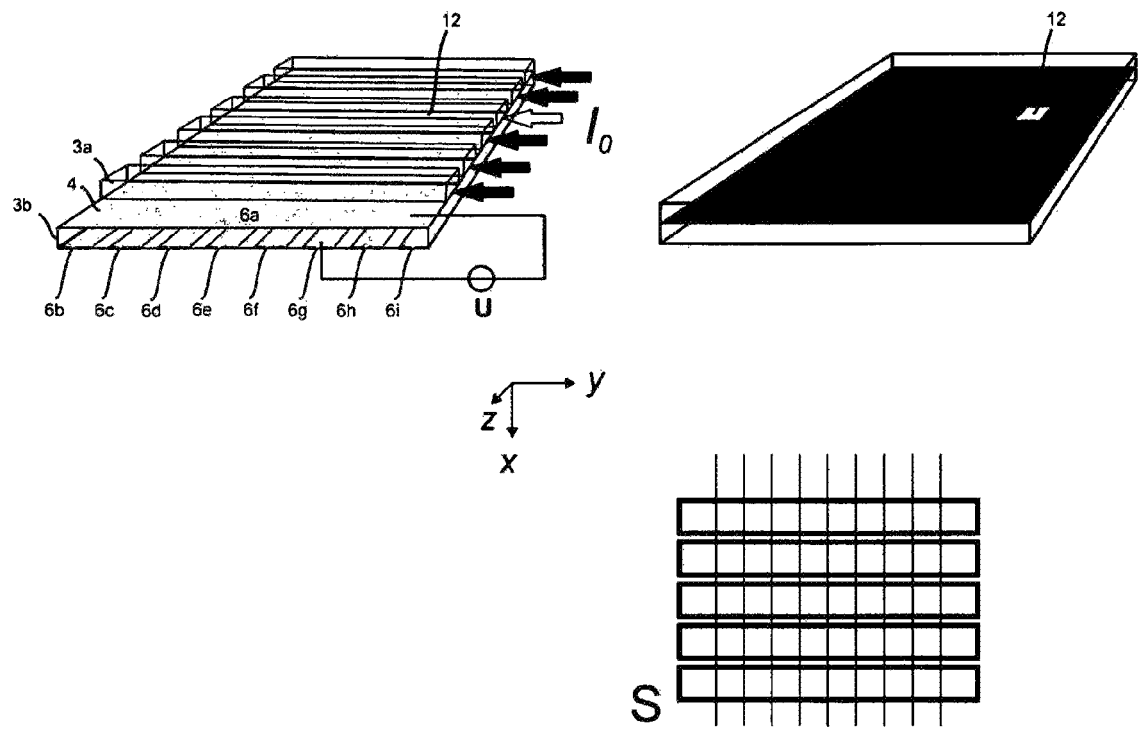

FIGS. 8 and 9 show embodiments in which a monochrome display is formed by a plurality of means for local nodal displacement.

The waveguide in FIG. 8 has a basic construction according to FIG. 2, but a first group of electrodes 10a, 10b, . . . is arranged on the plane of the structure (not shown here), each electrode 10 of which is elongated in the y direction. The electrodes are all parallel to and spaced apart from one another. a second group of electrodes 11a, 11b, . . . is thus arranged between the substrate (not shown in the picture) and the lowest dielectric view of the waveguide so as to be spaced apart from the first group in the stacking direction. These electrodes are also parallel to and spaced apart from one another but are elongated in the z direction and thus perpendicular to the first group.

Each individual electrode of the groups can be acted upon by an electric potential, the electrodes of different groups being subjected to different potential in order to form a potential difference and thus an electric field between the electrodes of the two groups.

The electric field results in the region of overlap 12, where two electrodes 10, 11 actuated with different potentials cross when viewed in the stacking direction x. The region of intersection thus defines the pixel on which the light-outcoupling is to take place, since the node position of the propagating mode is shifted only there. In the case of a color display, the procedure would be similar for the individual subpixels.

The first group can thus define the possible row positions of the display, and the second group can define the possible column positions of the display.

If the waveguide is supplied with a single light source, a monochrome display results. According to the invention, the light of this light source (denoted by 10 in the figure) will then illuminate the entire surface of the display as uniformly as possible. Successively time-controlled different light sources, the same subpixel can also operate in multicolor mode in the time-division multiplex. The schematic (denoted by S in the figure) at the bottom right illustrates that the entire display consists of a single waveguide (bold rectangle) and that both row and column are selected through electrical addressing of individual electrodes (narrow lines).

FIG. 9 shows an embodiment that also corresponds basically to the construction of FIG. 2. However, the waveguide is constructed here such that the upper laminate 3a is not continuous over the surface of the waveguide, but rather is formed by adjacent parallel, spaced-apart strips. Each strip forms one row of the display here. In another embodiment, the laminate 3b between the strips could also be removed.

In the example shown, the lower laminate 3b is formed over the entire surface and carries a full-surface light-outcoupling layer 4, the full-surface electrode 6a that is thus positioned in the node position or at least in the vicinity thereof, and all strips of the upper laminates 3a. The strips of the upper laminate 3a are all parallel and elongated in a first direction y corresponding to the row direction.

Beneath the lower laminate 3b are arranged strip-shaped electrodes 6b, 6c, 6d, . . . that are spaced apart in parallel and are elongated in a direction z, here perpendicular to the direction y.

Each strip of the upper laminate 3a has at least one separate light source (denoted by 10 in the figure), so that an entire strip is always flooded with light and the light propagates in the waveguide formed by the strip and the lower laminate 3b but is limited laterally by the strip. The row position is thus defined in the display by controlling the respective light source.

The desired column position is defined for this purpose by controlling the desired electrode (6b, 6c, 6d, . . . ). Light is thus coupled only out of the illuminated strip of the laminate 3a beneath which an electric field is generated by the electrode 3b. A pixel or subpixel is defined here by the overlapping zone of the strip of the laminate 3a and the electrode 6b when viewed in the stacking direction. The schematic to the lower right (denoted by S in the figure) is intended to make clear that the entire display consists of a plurality of waveguides (bold rectangles) that make the row selection possible, whereas only the column selection is performed through electrical addressing of individual electrodes (narrow lines). This schematic is shown again in FIG. 10.

Figure 10:
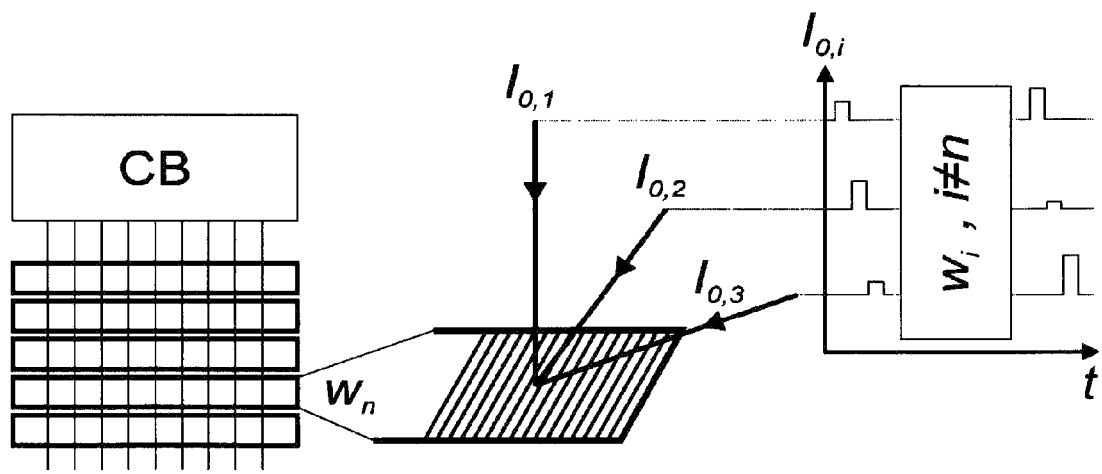

FIG. 10 shows a schematic illustration of the implementation of a color display. As shown in FIG. 9, it consists of strip waveguides that enable rows to be defined. The incoupling of light at the end of a strip-shaped waveguide is shown under enlargement for the n-th waveguide (denoted by $W_n$ in the figure) and takes place in analogous fashion for each strip-shaped waveguide. First, the excitation must ensure that the highest possible proportion of the incident light intensity is coupled into the correct mode that is required for the function of the display.

One example of a possible embodiment is a grating coupler. It couples light of a defined wavelength that is incident from a defined direction into a waveguide mode having a defined effective refractive index. By setting an exact angle, it is thus possible, for example, to ensure that almost all light is coupled into the $TE_1$ mode and not into the corresponding fundamental mode, since the light of the fundamental mode would be immediately coupled out of the structure and thus lost for the application. The greater the difference of the effective index of the modes involved (waveguide design) and the smaller the spectral width (difference in the wavelength of the light spectrum) and beam divergence of the light source (difference in angle of incidence on the grating coupler), the better this works. The latter-mentioned requirements can be satisfied very well with lasers in particular.

In the example, but in general as well, a blazed grating that was imprinted in the end of a respective waveguide, here the strip-shaped waveguide, can be used for coupling light into a waveguide. The grating is represented schematically by the parallel lines perpendicular to the strip length. A plurality of, here three, laser beams are used that are polarized in the desired direction (denoted by 101, 102, 103 in the figure), e.g., a red one, a green one, and a blue one, that are coupled very efficiently (typically significantly over 50%) by the coated blazed grating into the desired mode. They generally meet at different angles on the grating for this purpose.

The diagram to the right shows the respective brightness of the laser ($1_{0, i}$) incident on the grating as a function of time (denoted by t). It is crucial in this embodiment that only one laser beam strike the waveguide at any point in time. It is therefore always illuminated monochromatically. Moreover, and not shown in FIG. 10, only one row is always illuminated. This is symbolized by the box with the inscription (wi, 1 n) that thus marks the period of time in which all other waveguides or rows of the display are illuminated. To summarize, only one row (i.e. one strip-shaped waveguide) is illuminated at a time in only one color. The respective brightness of this illumination can be changed.

Column selection (vertical bars and boxes labeled CB) is accomplished through electrical addressing of the respective means (as exemplified and described with reference to FIG. 9). The brightness values of all subpixels of the currently switched-on color of the currently switched-on waveguide can all be addressed simultaneously, since they do not act on the other waveguides that are of course dark. This results in a new and, above all, extremely fast type of display addressing. Analog levels can generally be used both for column selection and row illumination. The diagram to the right in FIG. 10 shows that the brightness levels vary. This corresponds to the "follow-up control of the intensity of the light source" described above. This is necessary in order to achieve the desired brightness for each subpixel in the case of a larger number or brightness of luminous subpixels. What is more, analog levels for column selection can be used to compensate for any non-negligible propagation losses within the waveguides. The means of the columns that are located farther away from the light source would be actuated with commensurately greater intensity.

Due to the extremely high switching speeds that can be expected and the high local intensities that can be achieved by laser irradiation, it is even conceivable for the subpixels of the currently switched-on color of the currently switched-on waveguide to also be switched in succession. In this case, only one subpixel with one color would be switched on at any point in time. Accordingly, one would not need to "adjust the intensity of the light source," but only to compensate for possible propagation losses. This could be ensured according to the selected level of the light source (depending on the pixel position currently switched on), so that it would be possible to revert to constant levels again on the part of the column selection.

One advantage of using lasers as light sources is the especially large color space that can be achieved. Disadvantages might lie in the manufacturing costs. The display according to FIG. 10 could use three lasers per display row in the simplest case. However, since only one row is illuminated at any one time, it makes perfect sense to apply the concept for column selection to the row selection. This is shown schematically in FIG. 11.

Figure 11:
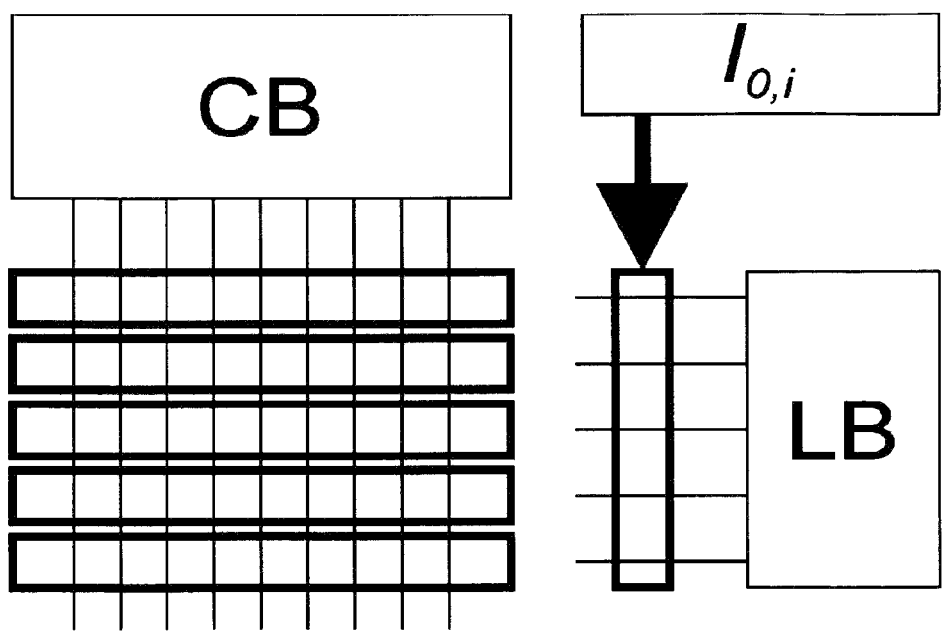

FIG. 11 shows a schematic similar to FIG. 10. In this connection, light from the light sources ($1_{0,i}$) is coupled into a common light source waveguide (bold rectangle running from top to bottom) or into a light source waveguide for each light source. The row selection is now also carried out using the method according to the invention (shown in the figure by the horizontal lines and the box labeled LB). At exactly one respective row position, light from the light source waveguide is coupled into the waveguide of the display corresponding to this row position (several bold rectangles running from left to right). The outcoupling from this waveguide occurs at the selected column in the manner described above. The column selection is shown in the figure by the vertical lines and the box labeled CB). An advantage of this arrangement is the reduction of the total light sources required. In the simplest case, three appropriately powerful light sources, preferably lasers, are sufficient for the entire color display.

Funding was provided for the project on which this application is based by the European Union's Horizon 2020 research and innovation program through grant agreement no. 637367.

The invention claimed is:

1. A waveguide comprising
    a substrate carrying at least two laminates forming a stack extending in a stacking direction, the laminates each having at least one transparent dielectric layer with a higher refractive index than the substrate;
    a light-outcoupling structure influencing light propagation and that extends as a layer at least in some regions between two adjacent laminates, a position of the structure in the stack corresponding to a node position of a waveguide mode that can be guided in the waveguide with at least one node; and
    at least one means for generating an electrical field in the stack and therewith at least temporarily changing an optical thickness of at least one of the laminates that has a refractive index or geometric thickness changeable by the electric field and that is adjacent the structure and thereby also changes the position of the node of the guided waveguide mode and the structure relative to one another.

2. The waveguide according to claim 1, wherein the structure for the purpose of coupling light out of the waveguide is a scattering structure or diffractive structure or reflective or luminescent structure.

3. The waveguide according to claim 1, wherein the waveguide is symmetrical around the structure when viewed in the stacking direction such that the node lies in a center between the layers surrounding the structure for all wavelengths, the waveguide being symmetrical with respect to the geometric thicknesses and the refractive indices of substrate and the layers.

4. The waveguide according to claim 1, wherein the means has at least two controllable electrodes arranged in or on the stack and generating the electric field such that the electric field at least temporarily penetrates the one layer of the stack adjacent the structure.

5. The waveguide according to claim 4, wherein at least one of the electrodes is at the node position or at least in the vicinity of a node position of a waveguide mode guided in the waveguide.

6. The waveguide according to claim 5, wherein the electrodes in a node position or at least in the vicinity of a node position of a waveguide that can be guided in a waveguide mode are spaced apart in at least one of possible directions of propagation of a waveguide mode, with surface regions of adjacent electrodes interdigitally intermeshing.

7. The waveguide according to claim 5, wherein one of the electrodes is at the node position and is formed by the structure itself.

8. The waveguide according to claim 5, wherein one of the electrodes is in the vicinity of the node position adjacent the structure.

9. The waveguide according to claim 5, wherein the electrodes are spaced from each other in the stacking direction and one of the electrodes is at the node position or at least in the vicinity of the node position and is
    i) adjacent the stack between the substrate and the stack, or
    ii) in another node position of the same guidable waveguide mode.

10. The waveguide according to claim 1, wherein a plurality of the means are multiply arranged adjacent one another in the directions of propagation parallel to the layers, the plurality of means particularly forming an n×m matrix, where n≥1 and m>1.

11. The waveguide according to claim 10, wherein a subpixel of a display formed by the matrix is defined by the geometric boundary of each means when viewed in the stacking direction.

12. The waveguide according to claim 10, wherein
    a) the waveguide comprises a first group of a plurality of electrodes lying parallel next to one another, each of which is elongated in a first possible direction of propagation lying parallel to the layers, and
    b) the waveguide comprises a second group of a plurality of electrodes lying parallel next to one another, each of which is elongated in a second possible direction of propagation, the two directions of propagation being particularly perpendicular to one another, and c) the first and second groups are spaced apart in the stacking direction, and d) each means is formed by the surface regions of electrodes of the first and second group that are arranged so as to overlap in the stacking direction.

13. The waveguide according to claim 1, wherein the light-outcoupling structure is:

a) a structured metal layer etched after deposition and of silver;

b) a roughened metal-coated surface of a layer of a laminate;

c) a blazed grating;

d) layers of metallic or dielectric nanoparticles or nanorods;

e) defects within a polymer layer;

f) phase transitions in block copolymers;

g) luminescent layers; or h) metallic electrostatically movable membranes.

14. A display with a row and column arrangement of controllable subpixels, comprising at least one waveguide according to claim 1, wherein the subpixels are defined by the means for at least temporarily shifting the position of the node and structure relative to one another.

15. The display according to claim 14, wherein the waveguide comprises all subpixel-defining means of the display.

16. The display according to claim 14, wherein each row of subpixels is associated with at least one separate waveguide whose means for changing the optical thickness form the columns.

17. The display according to claim 16, wherein each separate waveguide comprises all subpixel-defining means of one row.

18. The display according to claim 16, further comprising: spectrally different light sources whose light propagates successively in a common light source waveguide or whose light propagates in a respective spectrally associated light source waveguide, the light being coupled by a controllable master coupler from a light source waveguide into a separate waveguide belonging to each row of subpixels and selected by the control.

19. The display according to claim 14, wherein the waveguide further comprises:

at least one laser light source for coupling light into the waveguide, the intensity of the light generated by the light source being changed according to the number of means currently being actuated in order to change the node position and the intensity of this actuation, the intensity being increased as the number of actuated means and the intensity of this actuation increases.

20. The display according to claim 14, wherein a plurality of waveguides are one above the other in a stack, the different stacked waveguides having laser light sources for incoupling light whose wavelength spectrum is different so as to cover a selected color space together.

21. The display according to claim 20, wherein the means belonging to a common colored luminous pixel of a plurality of subpixels of the stacked waveguides forming respective subunits are arranged so as to not be aligned in the stacking direction or offset.

22. The display according to claim 14, further comprising:

a plurality of separate laser light sources each capable of producing light of a display spectrum, and the different light sources are time-controlled so as to successively emit the light from all of the wavelength spectra with each subpixel.

23. A method of coupling light out of a waveguide, according to claim 1, wherein the light propagates as a waveguide mode with at least one node whose node position corresponds to the position of a structure influencing light propagation in the waveguide, and the position of the node of the waveguide mode and the structure relative to one another is at least temporarily shifted, by shifting the node relative to the structure or by shifting of the structure relative to the node.

\* \* \* \* \*